US009770641B2

(12) United States Patent
Pisupati et al.

(10) Patent No.: US 9,770,641 B2
(45) Date of Patent: Sep. 26, 2017

(54) POINT TRACKING AND GAME ANALYSIS IN TENNIS

(71) Applicant: CourtMatics Corporation, Campbell, CA (US)

(72) Inventors: Bhanu Nagendra Pisupati, Milpitas, CA (US); Andrey Reznik, Campbell, CA (US); Vadim Blank, San Jose, CA (US)

(73) Assignee: COURTMATICS CORPORATION, Campbell, CA (US)

( * ) Notice: Subject to any disclaimer, the term of this patent is extended or adjusted under 35 U.S.C. 154(b) by 0 days.

(21) Appl. No.: 14/855,276

(22) Filed: Sep. 15, 2015

(65) Prior Publication Data

US 2016/0074739 A1     Mar. 17, 2016

Related U.S. Application Data

(63) Continuation-in-part of application No. 14/546,665, filed on Nov. 18, 2014.

(60) Provisional application No. 62/050,208, filed on Sep. 15, 2014.

(51) Int. Cl.
| | |
|---|---|
| *A63B 69/38* | (2006.01) |
| *A63B 71/06* | (2006.01) |
| *G06Q 10/06* | (2012.01) |
| *G09B 19/00* | (2006.01) |
| *G06K 9/00* | (2006.01) |

(52) U.S. Cl.
CPC ..... *A63B 71/0669* (2013.01); *G06Q 10/0639* (2013.01); *G09B 19/0038* (2013.01); *G06K 9/00543* (2013.01)

(58) Field of Classification Search
CPC ..... A63B 24/00; A63B 24/003; A63B 24/021; A63B 69/38; A63B 2220/40; A63B 2220/44; A63B 2220/833; A63B 2225/50; A63B 2024/0056; G06Q 10/0639; G09B 19/0038; G06K 9/00543
See application file for complete search history.

(56) References Cited

U.S. PATENT DOCUMENTS

| | | | |
|---|---|---|---|
| 2011/0183787 A1* | 7/2011 | Schwenger | A63B 49/00 473/553 |
| 2013/0053190 A1* | 2/2013 | Mettler | G09B 19/0038 473/463 |
| 2013/0095962 A1* | 4/2013 | Yamamoto | A63B 69/38 473/464 |
| 2013/0127866 A1* | 5/2013 | Yamamoto | G06T 11/206 345/440 |
| 2013/0158939 A1* | 6/2013 | Yamamoto | G09B 19/0038 702/141 |

(Continued)

*Primary Examiner* — Raleigh W Chiu

(57) ABSTRACT

A tennis analysis system analyzes tennis game play and generates game statistics for one or more players involved in a tennis session including match play. The system involves electronic portable devices that may be in a form of a dampener device. The portable devices can be mounted on tennis rackets for capturing stroke and other game related data during tennis play. Further, supplemental data may also be captured using personal devices such as mobile phones. The data generated by the electronic portable devices and personal devices can be used in combination by the tennis analysis system to perform game analysis.

31 Claims, 15 Drawing Sheets

(56) References Cited

U.S. PATENT DOCUMENTS

| | | | |
|---|---|---|---|
| 2013/0267338 A1* | 10/2013 | Boyd | A63B 69/36 |
| | | | 473/223 |
| 2014/0206481 A1* | 7/2014 | Zuger | G06K 9/00342 |
| | | | 473/463 |
| 2014/0342851 A1* | 11/2014 | Jackson | A63B 69/38 |
| | | | 473/464 |
| 2015/0016685 A1* | 1/2015 | Matsunaga | G09B 19/0038 |
| | | | 382/103 |
| 2015/0029341 A1* | 1/2015 | Sinha | H04N 5/772 |
| | | | 348/157 |
| 2015/0045153 A1* | 2/2015 | Thurman | A63B 69/38 |
| | | | 473/553 |
| 2015/0057778 A1* | 2/2015 | Mace | A63B 69/38 |
| | | | 700/91 |
| 2015/0057941 A1* | 2/2015 | Mace | G09B 19/0038 |
| | | | 702/19 |
| 2015/0120021 A1* | 4/2015 | Kerhuel | A63B 69/38 |
| | | | 700/91 |
| 2015/0141175 A1* | 5/2015 | Pisupati | G06Q 10/0639 |
| | | | 473/461 |
| 2016/0074739 A1* | 3/2016 | Pisupati | A63B 71/0669 |
| | | | 700/92 |

* cited by examiner

101

200

600

700

800

900

1000

1100

1400

POINT TRACKING AND GAME ANALYSIS IN TENNIS

This application is a continuation-in-part of application Ser. No. 14/546,665, filed Nov. 18, 2014, and claims the benefit of U.S. Provisional Application No. 62/050,208, filed Sep. 15, 2014, both of which are incorporated by reference herein.

TECHNICAL FIELD

The embodiments herein relate to point tracking and games analysis for tennis using inertial sensors.

BACKGROUND

Tennis a racket sport that requires the use of a racket to swing at a moving ball. Like most sports, and particularly racket based sports, technique and analysis of game are essential aspects of effective game play.

Traditionally, in the game of tennis, players have been relying on their coaches to record data about patterns, technique, and game play during a game to get feedback for further development of their game. With the advent of Micro Electro-Mechanical Systems (MEMS), and standardized wireless (example, WiFi) and wired communication means (example, USB), it is now possible to build devices that can be attached to a Tennis racket to aid in various aspects of the game.

A few such devices have been developed to aid tennis players. Most of the devices focus on narrow aspects like swing pattern, power of a stroke, and so on. While such devices are very useful in providing specific help to players, they are unable to provide analysis beyond the strokes. Tactical aspects of the game that determine outcome of rallies and ultimately entire matches are not addressed by these devices. Further, most of the devices are unable to provide widely used statistics that are of interest to coaches and players. Such statistics are central to the understanding of a player's game, and provide valuable input in making necessary tactical changes for better results. While certain systems have been developed to provide analysis of a tennis game, they are very expensive and require extensive setup using multiple cameras, and therefore are out of the reach of most tennis players.

Therefore, there is a need for a simple system that can provide comprehensive analysis of game statistics, technique and tactics in an affordable and convenient manner.

BRIEF DESCRIPTION OF THE FIGURES

The embodiments herein will be better understood from the following detailed description with reference to the drawings, in which.

DETAILED DESCRIPTION OF EMBODIMENTS

Figure 1:
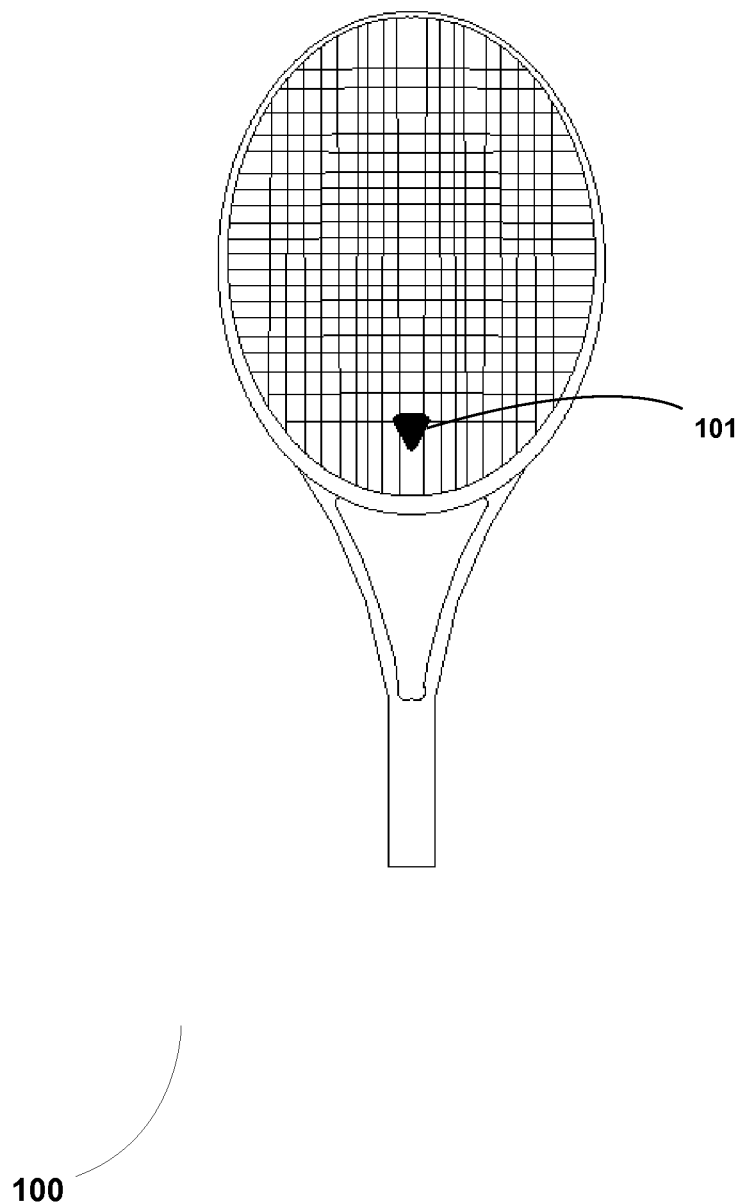
FIG. 1 illustrates a portable device, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein enable methods and systems for capturing data from tennis game play and game analysis including generating game statistics for one or more players involved in a tennis session including match play. An electronic portable device (also referred to as "portable device") that may be in a form of a dampener device (also known as shock absorber) can be mounted on tennis rackets for capturing stroke and other game related data during tennis play. Further, supplemental data may also be captured using personal devices such as mobile phones. The data generated by the electronic portable devices and personal devices can be used in combination by a tennis analysis system to perform game analysis.

Embodiments described specifically relate to mechanisms for allowing players, coaches or onlookers to register outcome of points as they are played, and analysis of the tennis game using data captured herein by the various devices and input by the various stakeholders.

In a preferred embodiment, a tennis session can be analyzed using a tennis analysis system.

In a preferred embodiment, the portable device has one or more buttons to enable players to input and record point result data.

Accordingly, in an embodiment, the portable device has a single input button for recording point result. A player may record point result by pressing the button a pre-determined number of times. For example, a player can press the button once for recording a point won, and twice for recording a point loss. The number of presses required for recording win and loss data can be configured.

In an embodiment, the single input button may be used to provide a specific result. For example, the button may be configured to record a win result by default. And, the portable device can record a loss result for points having no input. In other example embodiments, the single input button can be configured to obtain loss result input, in which case, no input of result is inferred as a win result for a point.

In other embodiments, the portable device can have multiple buttons. Referring to an example, the portable device can have two buttons—one button for recording win data and another button for recording loss data. A player can press the relevant button to recording point result.

In a preferred embodiment, players can also input and record point result data by way of gestures using their racket. The gestures can be recognized by attached portable devices and can be converted to relevant point result data before recording. Gestures so used may include but are not limited to clapping strings on face of said racket, clapping face of racket consecutively a pre-determined number of times, clapping frame of racket, clapping frame of racket consecutively a pre-determined number of times, tapping racket to a leg, tapping racket to a shoe, tapping portable device with a finger, and tapping portable device with a finger a pre-determined number of times. In using gestures for recording point result data, input for win and loss may be distinguished by way of using different number of taps, claps, movements and so on. For example, in using clapping face of racket as a gesture, clapping the face once may be used for recording win result, and clapping the face more than once may be used for recording loss result.

In various embodiments, the gestures and the corresponding movements used to recording point result data can be configured.

In a preferred embodiment, the portable device has at least one indicator to confirm player input.

Accordingly, in various embodiments, the input mechanisms can include but are not limited to visual indicators, audio indicators, or a combination of both to confirm the recording of a point. For example, an LED (Light Emitting Diode) light may be provided to confirm the recording of a point. A single flash of the LED light can indicate success of recording point result, and multiple flashes of the LED light can indicate the failure of recording point result. Some examples of visual indicators include blinking light with a pre-determined color, blinking light with a pre-determined pattern of blinking, blinking light with a pre-determined number of blinks, blinking light with a number of blinks equal to number of input claps, and blinking light with a number of blinks equal to number of input taps.

Similarly, a voice indicator can be provided to confirm recording of a point result. A single beep tone may be made to indicate success of recording point result, and multiple beep tones (or a pattern of tones) may be made to indicate failure of recording point result. In some embodiments, a combination of both visual and audio indicators can be provided to aid the player.

In a preferred embodiment, a portable device according to the embodiments herein can allow overriding a point result input by providing another input. Accordingly, in an embodiment, an overriding input can be provided by a player at least before the commencement of the next point in the game.

In various embodiments, the analysis system can infer result of a point even if the input result is missing. Inferring result of a point can be based on score of the game before the point, input from other players involved in the same tennis session, based on player stroke analysis for the point, or a combination of multiple such aspects thereof.

In a preferred embodiment, multiple portable devices involved in a tennis session can be synchronized by paring two or more portable devices for a tennis session. Pairing of devices may be done by placing the devices next to each other in close-proximity. The pairing may be done through exchange of data between devices through peer to peer communication mechanisms. More specifically, synchronizing devices involves exchanging synchronization tokens to align timelines in sensor streams from multiple devices. In an example embodiment, Near Field Communication (NFC) in peer to peer and active mode can be used to allow devices to communicate and synchronize when brought within close proximity of one another.

The users may have the option of recording point results through a third party observing the game and inputting the result through an application on a computation device such as a smartphone, tablet computer or a laptop computer. As points get recorded, the application may deliver the result to a remote server that is part of the stroke analysis system through any available networking mechanism. The application can display the current score that is updated automatically as each point is recorded. For input devices with inertial sensors such as accelerometers, the users may be able to tap the smartphone (or whatever else input device) a certain number of times to register the win/loss outcome, much like the procedure explained with tapping the device on the racket.

In various embodiments, an application to be accessed from personal devices can be provided for individuals involved (for example, support staff, supporters, and onlookers). Individuals can record point result data using their personal device for an ongoing tennis session. The application on personal devices can have identifier data of a player in order to track the player. The application can obtain the player identifier based on profile that is logged.

In one example embodiment, a coach may register himself on the tennis system and associated one or more players to be tracked. During a specific tennis session, he can choose one or more players for tracking and providing input. In another example embodiment, a player's credentials may be used to login to the tennis system in order to track and provide input for the player.

The correlation of point result stream from the mobile app and sensor stream from the device is based on occurrence in time. In some embodiments, the two sides can also synchronize at the start of a session so that there is a common initial time reference. And, events from both sides can be ordered temporally. The synchronization can happen using NFC just like the process for two portable devices.

In a preferred embodiment, based on inferences on strokes and directionality of strokes, the tennis analysis system can generate various statistics, including but not limited to statistics directed at individual players and statistics to understand play patterns involving multiple players. Example of statistics that can be generated include, but are not limited to single player statistics such as number of points won out of the total number of points played, number of points played with a volley at the net, number of points won with a volley at the net and number of breakpoints converted out of total number of breakpoints played on opponent's serve, and two player statistics such as number of serves that a player directs to opponent's forehand, number of serves that a player directs to opponent's backhand, forehand strokes a player directs to the opponent's forehand, forehand strokes a player directs to the opponent's backhand, backhand strokes a player directs to the opponent's backhand, backhand strokes a player directs to the opponent's forehand, total service winners for a player in a match including aces, number of double faults, highest serve speed, lowest serve speed, average serve speed, number of winners, total number of errors, number of unforced errors and number of forced errors.

Referring now to the drawings, and more particularly to FIGS. 1 through 15, where similar reference characters denote corresponding features consistently throughout the figures, there are shown embodiments.

Figure 2:
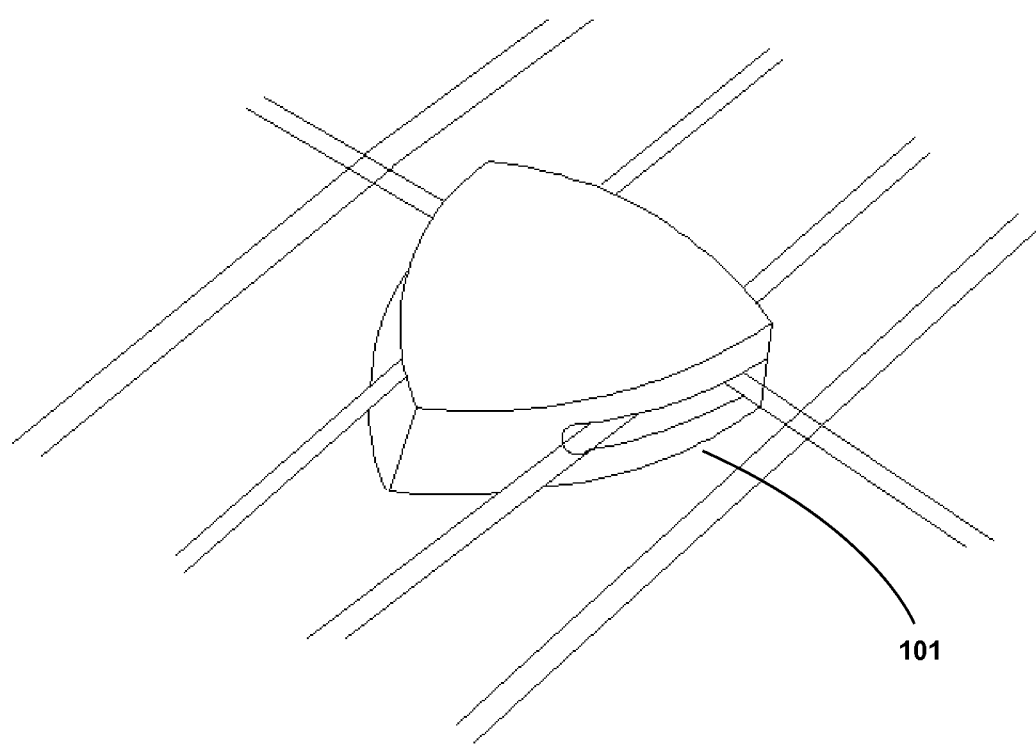
FIG. 2 illustrates a closer view of a portable device, according to an embodiment herein.
Figure 2:
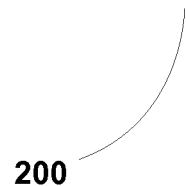

The portable device 101 is a tennis accessory that can be mounted on top a tennis racket in a minimally intrusive manner for the purposes of collecting racket movement data during play as measured by sensors within the device. The location of mounting can be on the strings, the frame or on the handle. In mounting the device 101 on the strings as shown in FIG. 1, it could serve the same functionality as a conventional tennis dampener used by several players today in addition to its proposed usage to collect sensor data. FIG. 2 provides a closer look at how the device 101 will rest on the strings, much like a conventional tennis dampener.

Figure 3:
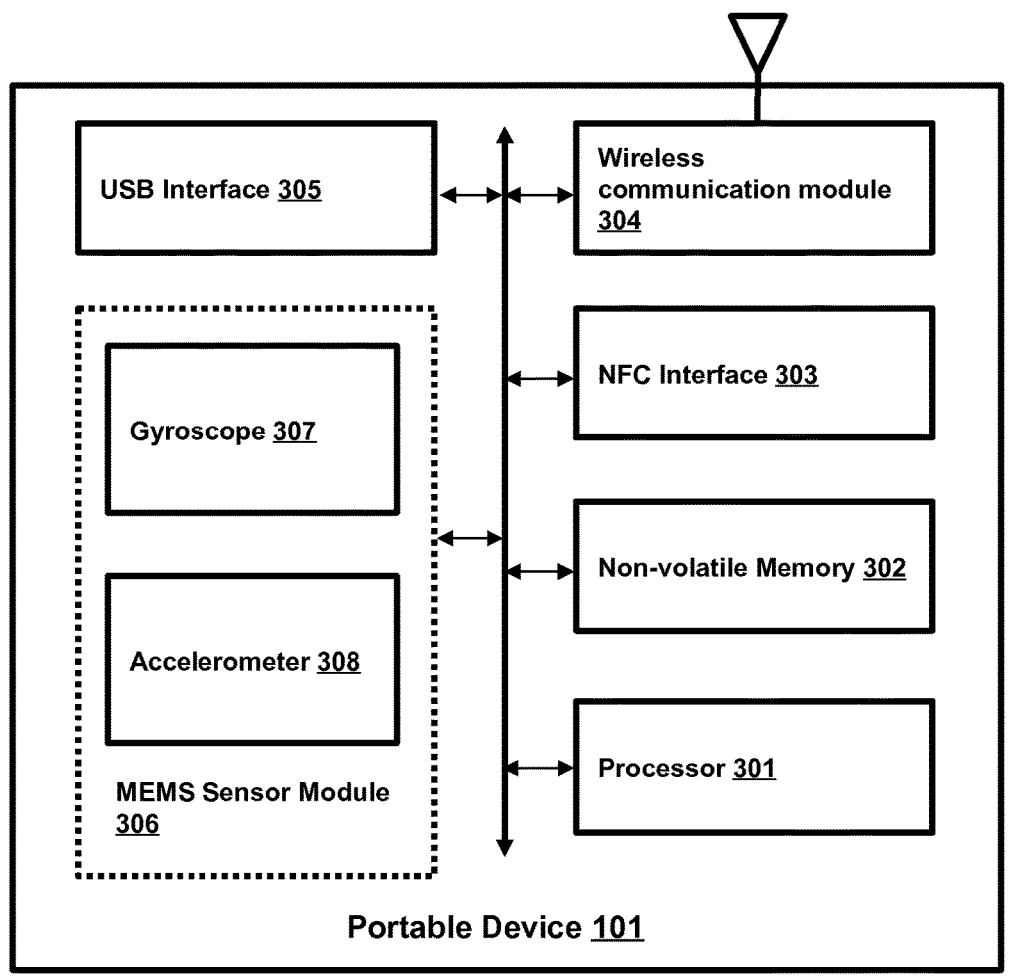
FIG. 3 is a block diagram of the portable device, according to an embodiment herein.

FIG. 3 is a block diagram of the portable device, according to an embodiment herein.

The device includes several hardware elements including Multi-axis MEMS sensors 306, Microprocessor 301, wireless communication module like Bluetooth 304, Non-volatile memory 302, Universal Serial Bus (USB) communication mechanism and a USB interface 305, Near Field Communication (NFC) module 303. Several of these electronic components in the device may be integrated into a single chip, such as a system on chip (SoC) device or a micro-controller, while others may be discrete chips. The circuit board may be enclosed in a lightweight protective casing made of rubber, plastic etc. thereby rendering a form factor similar to existing dampeners used on Tennis rackets today. The device is powered by an electric battery (not shown) on-board.

In some embodiments the device may also include a motion-powered charger, and an electro-acoustic transducer to charge the on-board battery.

The processing element (for example, a Microprocessor) 301 in the said device executes software that periodically measures the acceleration and the rate of rotation for x, y, and z axis by respectively reading these values from the accelerometer 308 and gyroscope 307. If these accelerometer and gyroscope devices are implemented as part of the same chip then these values may be read at designated memory addresses where these devices have been memory mapped. In case the sensors are external to the chip then standard inter chip communication protocols such as SPI or I2C can be used. The data is then stored into Non-volatile memory first and then eventually transmitted externally through Bluetooth 304, USB 305 or NFC 303 interfaces.

In various embodiments, the rate at which readings are recorded may be dynamically varied to optimize the memory required for storing the data and also to conserve battery power, for instance by logging data at a higher rate during active play and tempering the rate during periods of inaction.

In various embodiments, the software on the device 101 may in times of extended inactivity have the ability to transition the processor 301 to sleep mode during which it runs off a lower clock frequency and stops sensor data collection thereby enabling non-volatile memory 302 to enter low power modes as well. The processor 301 is then woken up through interrupts from the sensors interrupts that fire when readings exceed a defined threshold.

In various embodiments, the software may also optimize the power consumed by the non-volatile memory 302 by buffering readings over a period of time, which are then written together as a single write operation to the non-volatile memory 302 thereby allowing it to enter lower power states in between writes.

In some embodiments, the software may first encrypt collected data before writing to non-volatile memory 302, so that the data can be successfully read off the device only by genuine software that has the necessary secret encryption key data.

In other embodiments, the software may periodically add check sum values to the data stored into non-volatile memory 302. This can be used to ensure that data integrity has been maintained when it is later processed.

Figure 4:
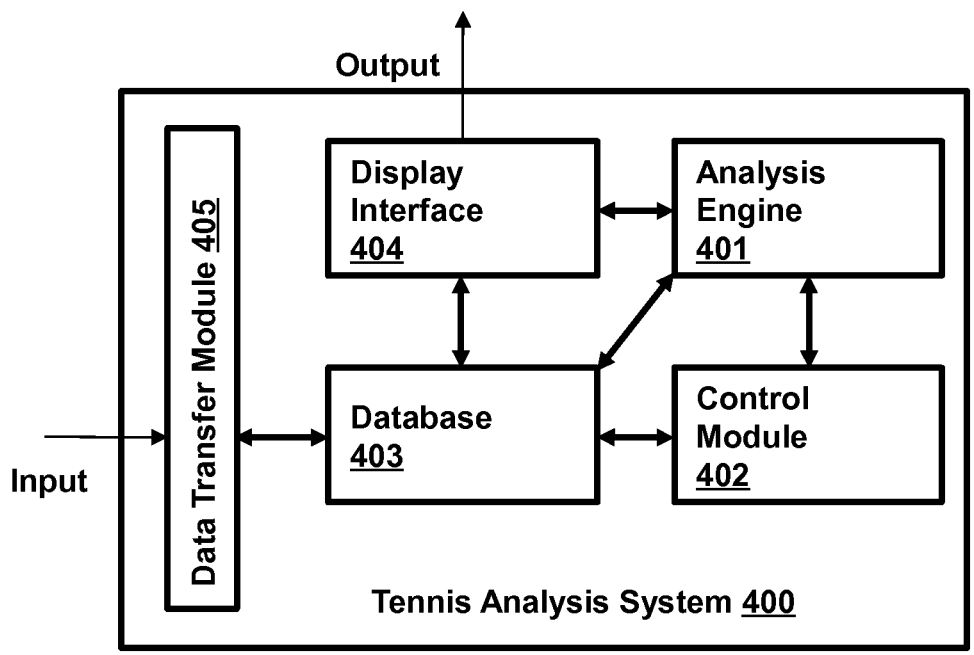
FIG. 4 is a block diagram of a tennis analysis system, according to an embodiment herein.

FIG. 4 illustrates a tennis analysis system that analyzes data retrieved from one or more devices 102, typically after completion of a tennis session. The tennis analysis system comprises of an analysis engine 401, a control module 402 with logic to pre-process data retrieved for analysis, a database 403 to store data obtained from portable device 101 or any data in process during analysis, a display interface 404 to provide visualization for data in the database 403 or for data obtained from the analysis engine 401, and a data transfer module to facilitate transfer of data from portable device 101 to the analysis system 400.

A tennis analysis system 400 is a computing device capable of executing applications to perform analysis on the data. Examples of the analysis system includes but not limited to personal computing devices such as laptops, smart phones, desktops, or tablets, and server grade systems using communication interfaces such as Bluetooth, USB and NFC. A data transfer module 405 in the system 400 relays the data to the database 403 for storage and further analysis.

Figure 5:
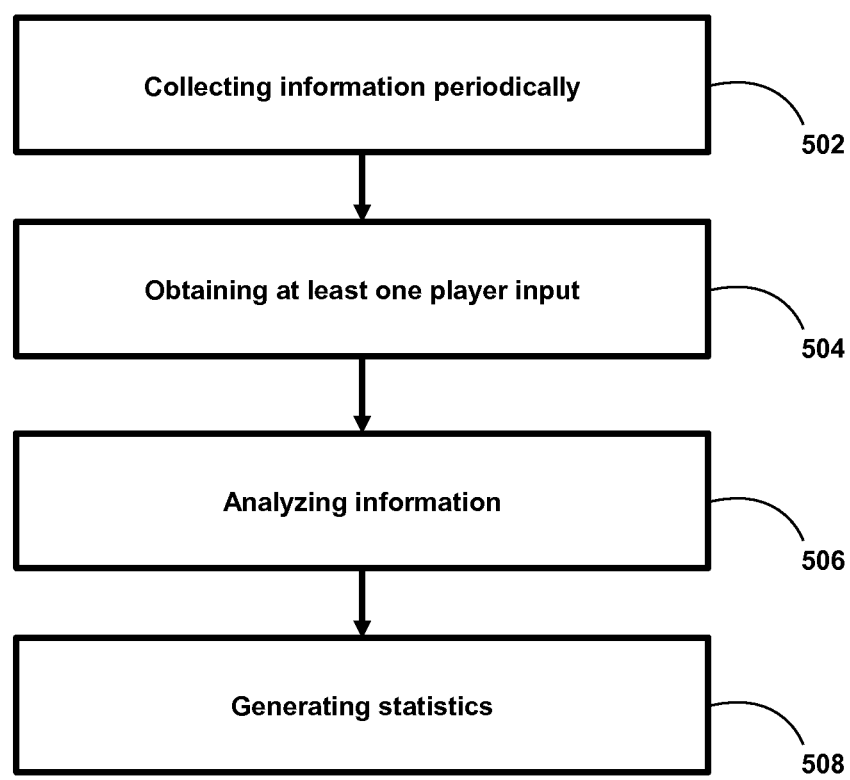
FIG. 5 illustrates a method for collecting data during game play and analyzing data to generate statistics, according to an embodiment herein.

FIG. 5 illustrates a method for collecting data during game play and analyzing data to generate statistics, according to an embodiment herein. The method involves collecting (502) data periodically by one or more portable devices, with each portable device being attached to a racket used in the tennis session. At least one of the various stakeholders including the players, support staff, and onlookers may input (504) point result data by using portable devices and personal devices (such as mobile phones).

Either during or at the completion of a tennis session, data is retrieved from the device by software applications (apps) executing on personal computing devices such as laptops, smartphones or tablets and relayed to a stroke analysis system comprising servers for storing and analyzing this data.

The portable device 101 can be equipped with an input mechanism that can be used by a player to mark a win or a loss for any point played upon completion. This data can be used to register the outcome of the rally while processing results.

Figure 6:
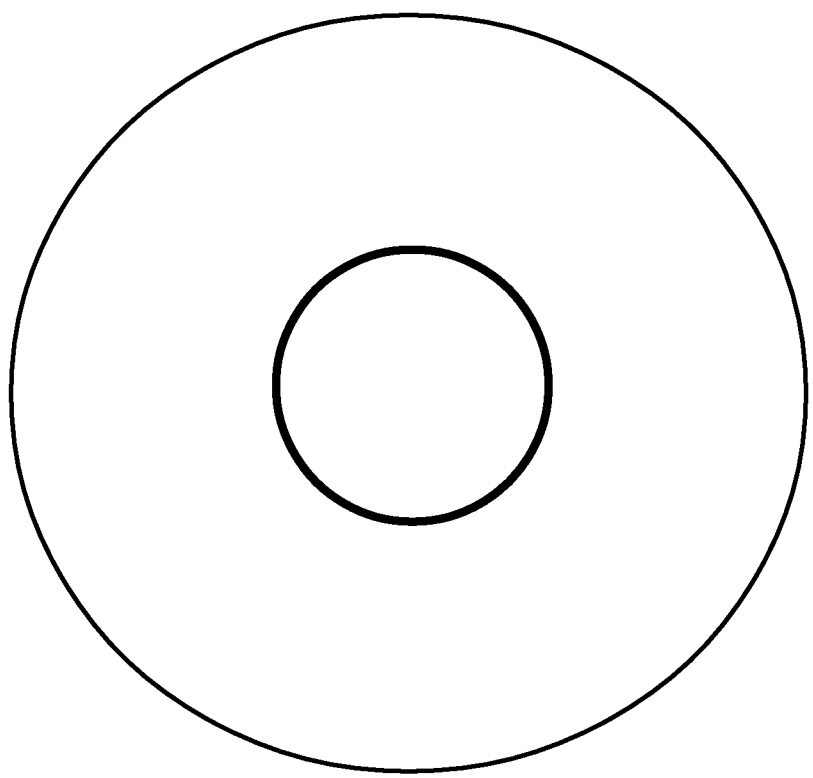
FIG. 6 and FIG. 7 illustrate input interfaces on a portable device, according to some embodiments herein.

The said input mechanism may be in the form of a single push button on top of the dampener as illustrated in FIG. 6. In one embodiment, the push button could be pressed once to register a point won and twice in succession (like a mouse double click) to register a point lost.

The device can provide visual or audio feedback after each entry is made for user confirmation.

Figure 7:
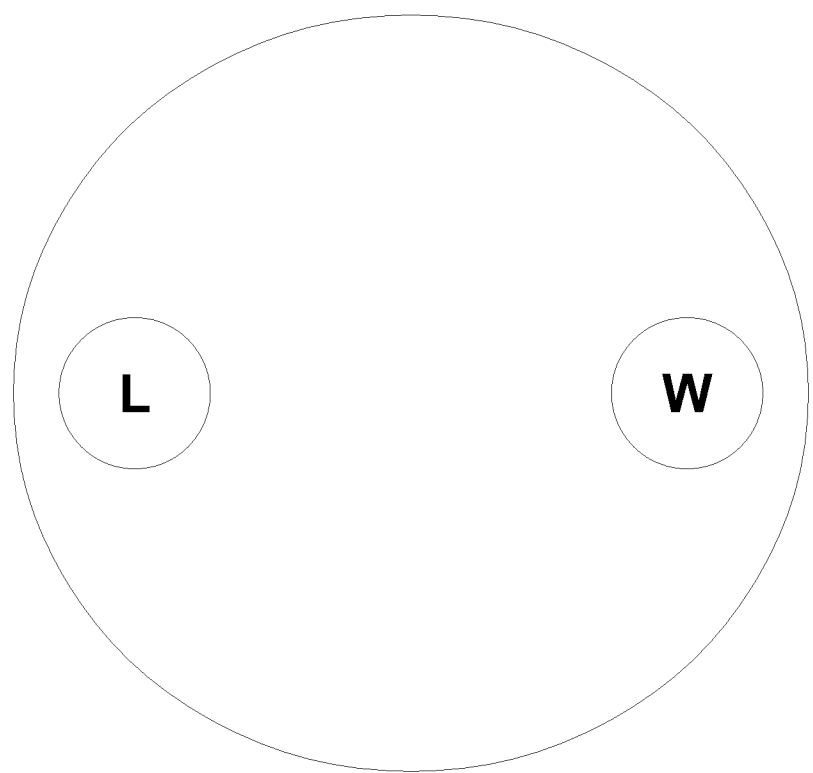

The said input mechanism may be in the form of a multiple buttons, as illustrated in FIG. 7. In an embodiment, one button can be dedicated to recording point loss result, and another button can be dedicated to recording point win result.

The said device can be equipped with a mechanism to add time markers to the collected sensor data which the user can later use to identify significant times during play. For example, the marker can be used to make note of start and end of a set in a tennis match, or of a completion of a particular tennis drill. Markers can be used to perform analysis for sub intervals within a larger period of play.

The portable device allows input and record point result data by way of gestures to be performed by a player using the racket with the device mounted. The portable device, through its sensors, recognizes gestures and converts input into relevant point result data before recording.

In an embodiment, the portable device can have pre-configured data on movements along x, y, and z axes, and related acceleration thresholds to identify gestures. The gesture data can be analyzed in real-time to identify point win or loss data to add specific result markers in the stream of data recorded by the device.

Alternatively, the device can also just record the gesture movement data as with any other movement data. In such a case, identification of the results associated with the gestures can be done during a post-analysis as performed by a tennis analysis system.

FIGS. 8 to 11 illustrate various example gestures that can be enabled by the portable device.

Figure 8:
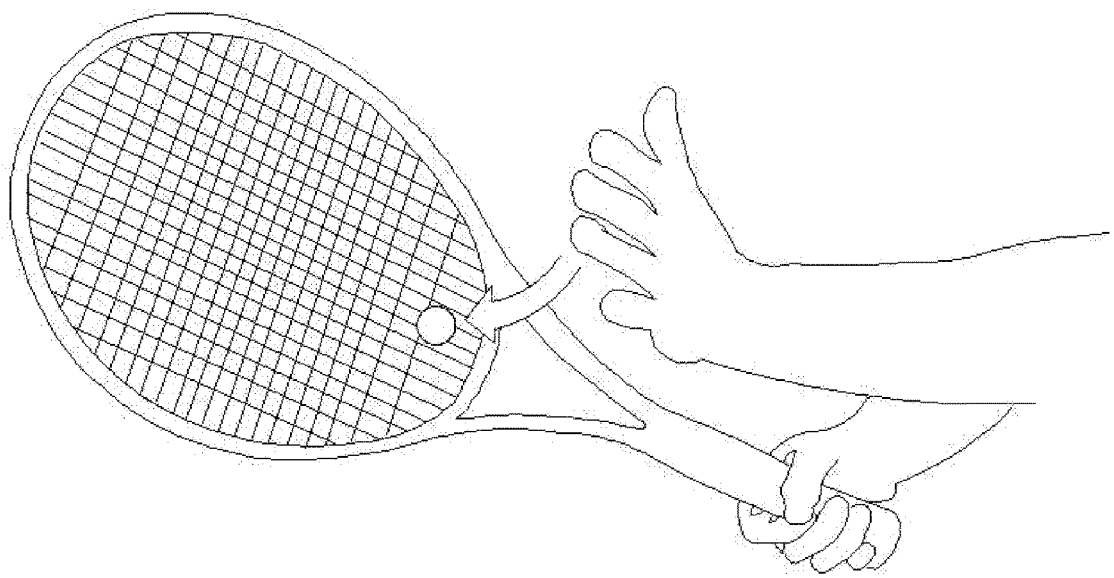
FIGS. 8 to 11 illustrate various gestures that may be performed by players to record point result, according to some embodiments herein.

Specifically, FIG. 8 illustrates a clapping gesture on the face of the racket mounting the portable device. In an embodiment, clapping once can be mapped to point win result, and clapping two or more times can be mapped to point loss result.

Figure 9:
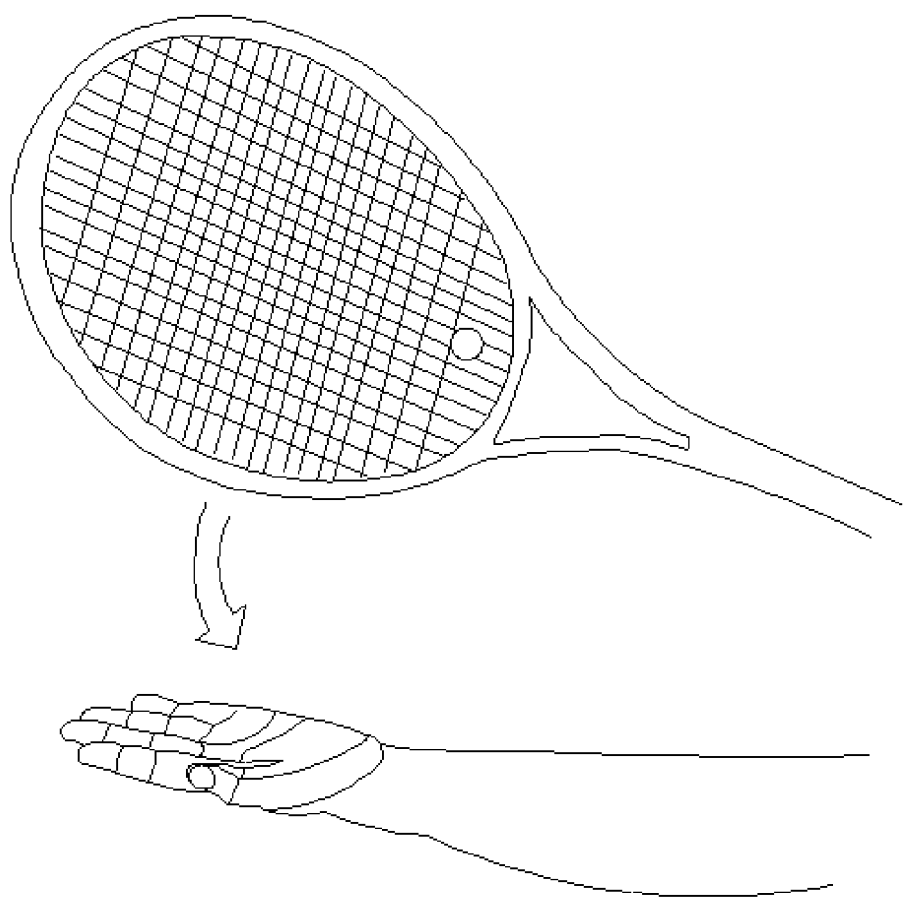

FIG. 9 illustrates a clapping gesture on the frame of the racket mounting the portable device. In an embodiment, clapping once can be mapped to point win result, and clapping two or more times can be mapped to point loss result.

Figure 10:
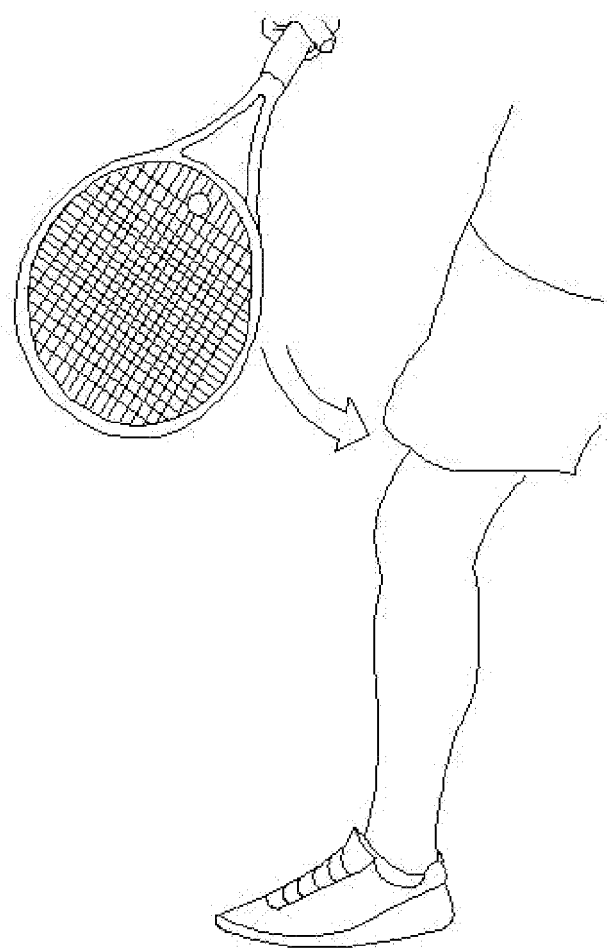

FIG. 10 illustrates a tapping gesture where the racket mounting the portable device is tapped to the leg of the player. In other embodiments, the racket may also be tapped to the shoe of the player. In an embodiment, tapping once can be mapped to point win result, and tapping two or more times can be mapped to point loss result.

Figure 11:
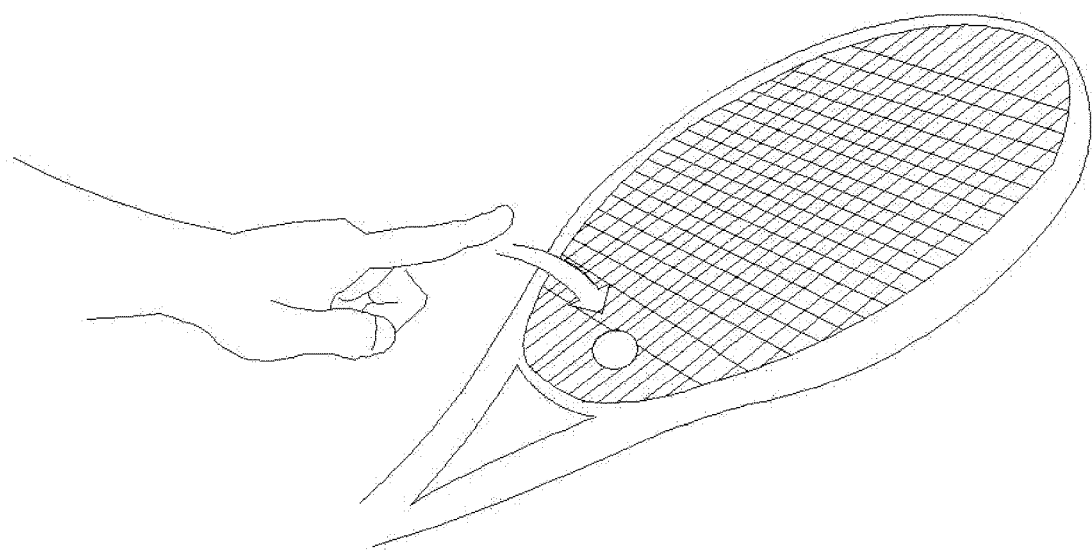
Figure 12:
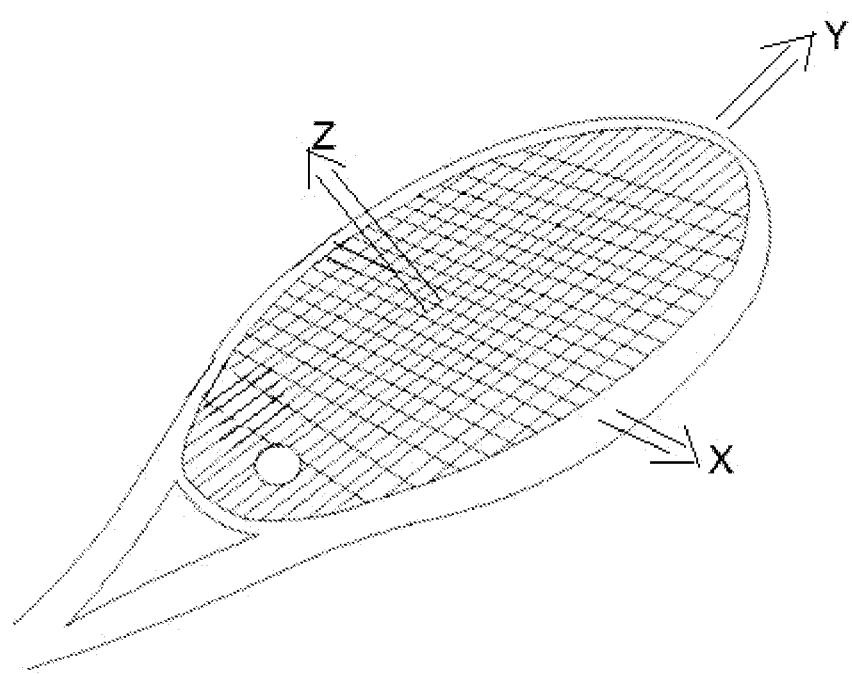
FIG. 12 depicts the axes in reference to the face of a racket as used throughout the description.

FIG. 11 illustrates a tapping gesture where the player taps the device one or more times using his finger. In one embodiment, tapping once can be mapped to point win result, and tapping two or more times can be mapped to point loss result.

The gestures and the corresponding movements used to recording point result data can be configured.

The identification or the various tapping and clapping actions may be done by analyzing sensor data obtained from one or more portable device. Clapping of the racket frame with the hand or tapping it to the leg renders a pronounced, short lived acceleration in the axis along the face of the racket and perpendicular to racket handle. This can be identified based on set of conditions that must occur:

an abrupt spike (sudden change in acceleration) in perpendicular axis to the racquet handle and along the face of the racket (such as axis X) while no significant spike is observed in other axes (such as Y and Z).

absence of significant volatility in acceleration within a certain period before and after the spike in axis X. This may be quantified as the acceleration being within a small range of values in the range of sensor values corresponding to that time period.

Tapping of the device renders a similar acceleration behavior, but along the axis perpendicular to the face of the racket. The method used to identify tapping is similar to the identification of clapping the racquet frame with one difference that the spike is observed in the axis perpendicular to the face of the racket (axis Z) and therefore no significant change in acceleration must be observed for the other two axes (X and Y). A similar requirement of volatility as in the previous case applies as well.

In case the user has entered the wrong point outcome, he may override the previously input result by recording again before the next point begins. The analysis system can then associate the last input result with the point.

The tennis analysis system uses data from the portable devices and personal devices including the point result data input by at least one stake holder to analyze (506) the data. The said analysis system processes the data and among other things classifies each valid tennis stroke as forehand, backhand, serve, volley, or slice based on analysis of sensor data; identifies directionality of strokes; determine result of points, games, sets and matches during the session; and thereby provides game statistics, analysis and coaching tips to players while also serving as a valuable tool to coaches (both henceforth called users).

The mechanisms to analyze and identify strokes, directionality of strokes, and rallies are detailed in the inventors' application Ser. No. 14/546,665 titled "TENNIS GAME ANALYSIS USING INERTIAL SENSORS", filed on Nov. 18, 2014.

Besides identifying the strokes, the said analysis system is able to identify the start and end of each rally based on the sensor data. Rally is defined as a back and forth exchange of consecutive strokes until a player either hits a winner or commits an error thereby ending the rally. The interval between consecutive strokes is based on the time delta between the stroke peaks and could be limited to a certain duration, say 3 seconds, for consecutives strokes to be classified as part of the same rally. If the interval is greater than that duration the stroke will represent a new rally and the prior stroke will conclude prior rally.

For match based scenarios, the said analysis system can identify whether a player is serving as opposed to returning the serve in a particular game based on whether the first shot for the player in the game is a serve or a ground stroke (corresponding to returning serve).

The analysis system is able to identify first and second serves. A serve followed by ground strokes is identified as a first serve. A serve following another serve within a predefined short window (say 2 seconds) without intervening groundstrokes is identified as a second serve.

The analysis system is able to identify when a game has concluded and the next game begun based on when the role of a player changes from a server to returner of serve or vice versa.

The win/loss data obtained from or inferred through input by players and other stakeholders can be used by the analysis system to generate (508) various game statistics.

The analysis system can identify the number of points won by the user out of the total number of points played. This can be calculated by identifying the total number of points by summing up the number of times the user has registered a point outcome through the win/loss input mechanism. The number of points won can be calculated by summing up the number of times the user has registered win as the point outcome.

The analysis system can identify net play statistics, which is the number of points in which the user has played a volley at the net, and how many of those points the user ended up winning. The system can analyze sensor data to differentiate the various kinds of strokes and thereby identify when a volley has been hit. The number of times the user has come to the net can be established by counting the number of rallies in which the user has hit a volley. The number of points among these that the user won the point can be determined by those for which the user registered the point outcome as a win using the input mechanism.

The analysis system can apportion the manner of winning or losing a point to the last shot played by the player categorized as forehand, backhand, volley or serve. This can be used by players and coaches to identify weaknesses and strengths of a player's game by analyzing the point win/loss trends based on shot type.

The win/loss data can be used by the analysis system to continuously keep track of score of the tennis session. The score can be used to identify breakpoints in the course of the match; a breakpoint is a point of time in the match when the server can lose the game by losing the next point. By identifying breakpoints, the analysis system can identify the breakpoint conversion rate statistic, which is the number of breakpoints that the user was able to convert out of the total number of breakpoints played on the opponent's serve.

The analysis system may be able to use sensor and win/loss data from devices on rackets of two players playing with one another to generate additional statistics. These shall be referred to as two-player statistics and the approach as the two-player approach.

Accordingly, portable devices can be used in a multi-player setting. More specifically, each player participating in a tennis session can have a portable device attached to their rackets.

Figure 13:
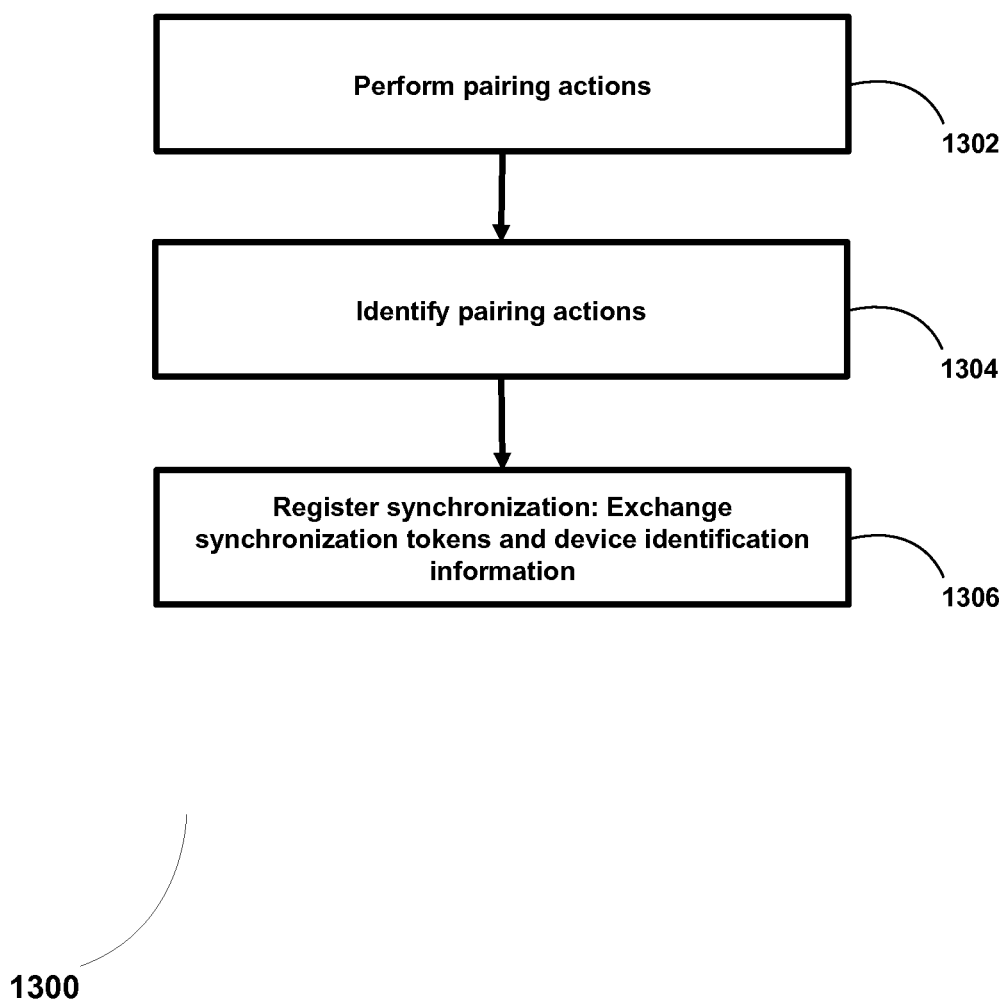
FIG. 13 illustrates the method of synchronizing rackets, according to an embodiment herein.

FIG. 13 illustrates the method of synchronizing rackets, according to an embodiment herein. In order for the data recorded on individual tennis rackets to be synchronized for analyzing the tennis session involving multiple players, tennis rackets involved in the session can be paired (1302) and synchronized so that each racket has data about other rackets involved in the tennis session.

Figure 14:
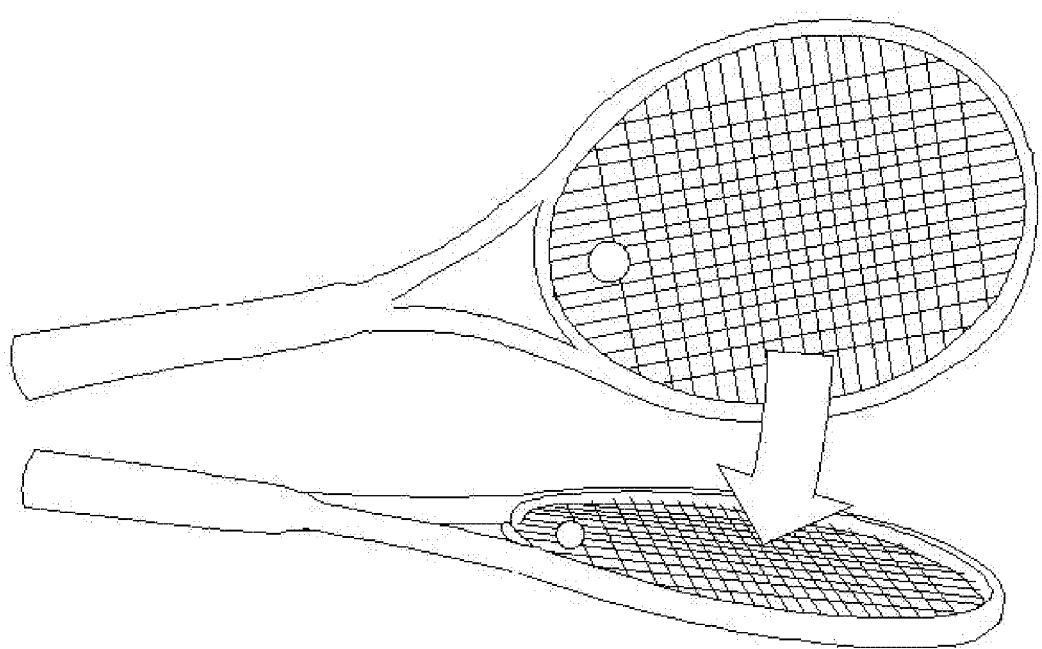
FIG. 14 illustrates a gesture for pairing portable devices, according to an embodiment herein.

One technique to synchronize shall be to tap the racket with one another in a certain pattern. Another pattern can be to tap the frame of one racket to the frame of the second racket. Yet another pattern can to place the face of one racket against another. Still another pattern might be to tap the frame of one racket to the strings of the second racket as shown in FIG. 14.

The analysis system registers the synchronization by scanning the sensor data streams from both devices to look for actions corresponding to the technique for the synchronization. The algorithms used to identify (1304) these actions are similar to that used for identifying racket gestures indicating point outcome. For the case when the racket frame is clapped with the strings of another racket, the axes whose acceleration is to be considered are the ones normal to the face of the racket (Z axis) for one racket and the axis along the racket face and normal to the handle (X axis) for the second. For the case when the frame of one racket is tapped against the frame of another, the X axis acceleration is considered for both rackets by the algorithms.

The synchronization registration (1306) for the two devices can occur automatically based on the use of peer to peer communication. The synchronization can occur based on exchange of synchronization tokens that can be used to align timelines in the respective device sensor streams. Peer to peer communication can also be used to exchange device data such as unique identifier in order to infer the other portable devices involved in the game. In an example embodiment, the portable devices 101 can enable the peer to peer communication through the NFC interfaces 303. The NFC interfaces 303 can operate in peer to peer and active mode to allow the devices to communicate and synchronize when brought in close proximity of one another.

As a result of synchronization registration, the analysis system identifies indices of samples in both data streams (sync_index_a & sync_index_b) corresponding to the synchronization action for the respective devices. These indices correspond to the same instant in time in both data streams and are used to level set the timeline across data sets between the two devices. They could be used to identify data points from both samples for any instant of time in course of play.

To identify the index of a data reading (index_a) in device A's data stream corresponding to an index (index_b) in device B's device data stream, the same index offset from the respective synchronization points is applied. The mechanism can be modeled using the following formula:

Index_a=sync_index_a+(index_b−sync_index_b)

One instance of two-player statistic is the number of serves that a player directs to the opponent's forehand or backhand in the course of a match. The algorithm involved identifies the data sample in the receiver's data stream corresponding to the ball impact for the serve from the server's data stream. The algorithm then identifies the first stroke in the receiver's data stream following this index. This stroke is categorized either as a forehand or a backhand and tabulated accordingly. It is possible that in case of an ace or a double fault that the receiver does not make contact with the ball while receiving the serve. This would be reflected in the device data as no groundstrokes being present for the rally starting with that serve and hence no associated return statistic applies.

A variation of this technique may be used to categorize the number of forehand strokes a player directs to the opponent's forehand as compared to backhand. The underlying algorithm identifies the data sample in the opponent's data stream corresponding to corresponding to the player's stroke in question based on the algorithm described. The algorithm then identifies the first stroke in the receiver's stroke following this index. This stroke is categorized either as a forehand or a backhand and tabulated to the right player stroke category based on whether the player stroke was a forehand or backhand. In all four categories exist: forehand to forehand, forehand to backhand, backhand to backhand and backhand to forehand.

The device data from both players may be used by the analysis system to determine the combined ace/service winner count in a match. An ace is a valid serve that the opponent did not make contact to with the racket; whereas a service winner is a valid serve that the opponent was able to make contact to but the return was not valid. The algorithm to identify either of these involves first identifying the ball impact for the serve from the server's data stream and then using the algorithm described above to identify the corresponding data sample in the receiver's data stream. The algorithm searches for a groundstroke in the receiver's data stream within a short time window as required for the ball to travel from the server to the receiver's racket (say 2 seconds). If no such groundstroke is present and the server ended up winning the point then the serve is registered as an ace. A serve is identified as a service winner when it is the only shot in the rally for the server and the server ended up winning the point (based on point outcome input) and the serve was not an ace.

In the absence of the data from the receiver's device the analysis system can determine the combined ace/service winner count in a match. A serve is identified as either an ace or service winner when it is the only shot in the rally and the server wins the point.

The serve speed can be determined using a variant of the serve categorization technique. The first step involves using the technique described to identify the sample in the receiver's data stream corresponding to ball impact for the serve from the server's data stream. Then the ball impact for the return is identified for that and the number of intervening samples between the serve and this return are identified. The duration corresponding to this interval is then calculated by multiplying the number of samples with the time per sample. The serve velocity is then calculated as the distance travelled by the ball divided by the time taken to travel from the server's to the receiver's racket. The distance travelled can be approximated as the distance between common positions of the server and receiver on the tennis court; one such approximation can be the distance with the server being two feet from the center line and the receiver being at the midpoint between the center line and the side line.

The distance travelled by the ball can be better approximated based on whether the returner hit a forehand or a backhand and whether the server hit the serve from the right side of the court or the left. Depending on the combination of these two attributes, the serve can be identified as "down the middle" or "cross court" as follow:

Serve from right side and return is forehand: cross court
Serve from right side and return is backhand: down the middle
Serve from left side and return is forehand: down the middle
Serve from left side and return is backhand: cross court The distance travelled by the ball for down the line serves is less as compared to cross court serves since in the latter case the ball travels diagonally across the service box whereas in the former case the ball travels down the length. There could be standard metrics for distance travelled by the ball for down the line and cross court serves based on typical path followed by the ball for either of these cases.

The number of double faults server by each player may be inferred using the two-player approach. A double fault occurs when both the first and second serves are invalid, either because they were netted or failed to land in the service box on the opponent side. A double fault is identified as the case where a second serve was not made contact with by the returner and the server registered the point as a loss. The algorithm for determining that the returner did not make contact with the serve involves identifying the data sample in the receiver's data stream corresponding to the ball impact for the serve from the server's data stream. The algorithm checks if any groundstrokes exist for the rally starting with that serve; this can be done by scanning designated serve travel duration (say 2 seconds) of data in the receiver's data stream to check for any groundstrokes. If no strokes are found in this interval then it implies that the receiver did not make contact.

Winners hit by a player in the course of a match can be identified using the two-player approach. The algorithm identifies a winner as a case where the player that won the point hit the last groundstroke in a rally. This in turn is deduced by first identifying the last stroke for both players for a particular rally. The later of the two, as measured by the one with the larger offsets from their respective synchronization points is identified as the last shot. The algorithm then determines the win/loss outcome for the point that was recorded. A win result indicates a winner having been hit by the player.

Errors made by a player in the course of a match can be identified using the two-player approach. The algorithm identifies an error as a case where the player that lost the point hit the last groundstroke in a rally. This in turn is deduced by first identifying the last stroke for both players for a particular rally. The later of the two, as measured by the one with the larger offsets from their respective synchronization points is identified as the last shot. The algorithm then determines the win/loss outcome for the point that was recorded. A loss results indicates an error having been made by the player.

Shots and therefore errors can be further classified into two groups—forced and unforced. Forced shot is detected by measuring absolute maximum acceleration in either X, Y, or Z axes to determine the force of the racquet movement right before the shot. In the event such racquet movement exceeds a predefined threshold (acceleration constant) the shot is classified as forced, otherwise as unforced.

In case a player missed inputting the result of a point the analysis system may indirectly infer the result in certain ways. For the case when the opponent had input the result for the same point then the result is inferred from there. For the case when the point was a game point for the player and the game concluded at the end of it then the result of the point is inferred as a win for the player. For the case when the point was a game point for the player and the game did not conclude at the end of it then the result of the point is inferred as a loss for the player. For the case when the point was a game point for the opponent and the game concluded at the end of it then the result of the point is inferred as a loss for the player. For the case when the point was a game point for the opponent and the game did not conclude at the end of it then the result of the point is inferred as a loss for the player.

Figure 15:
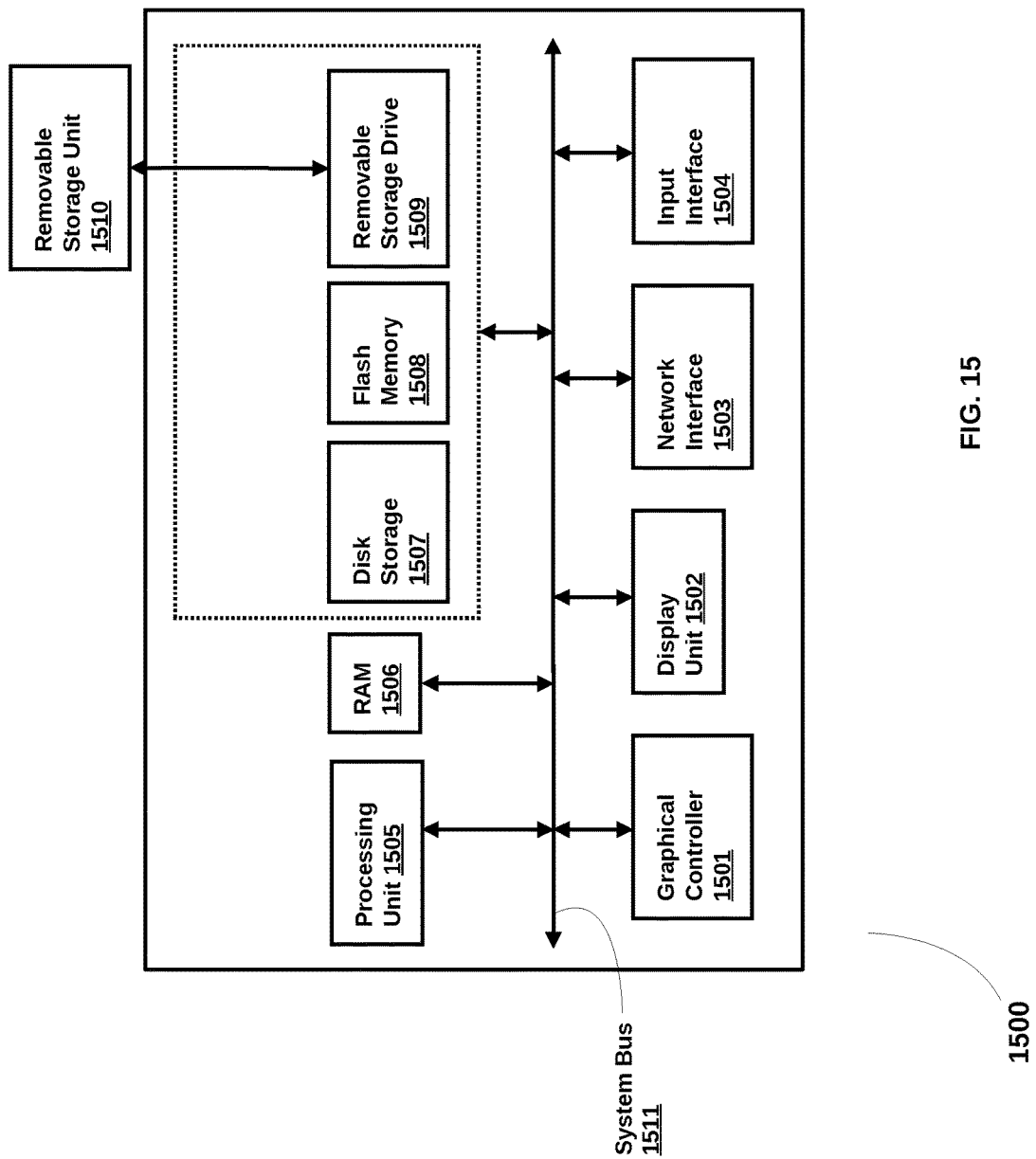
FIG. 15 illustrates a computing environment for a tennis analysis system, according to an embodiment herein.

FIG. 15 illustrates a computing environment for a tennis analysis system. A computing device in the form of a computer 1500 is described. Computer 1500 may include a processing unit 1505, a graphical controller (1501) for graphic processing, various system memory units 1506/1507/1508/1509/1510, input interface 1504, network interface 1503, display unit 1502, and a system bus 1511.

The processing unit 1505 can be any of various available processors. Dual microprocessors and other multiprocessor architectures also can be employed as the processing unit 1505.

The system memory may include volatile memory and nonvolatile memory. Nonvolatile memory can include read only memory (ROM), programmable ROM (PROM), electrically programmable ROM (EPROM) or flash memory. Volatile memory may include random access memory (RAM) 1506 which may act as external cache memory. The system bus 1511 couples system physical artifacts including the system memory to the processing unit 1505. The system bus 1511 can be any of several types including a memory bus, memory controller, peripheral bus, external bus, or local bus and may use any variety of available bus architectures.

Computer 1500 typically includes a variety of computer readable media such as volatile and nonvolatile media, removable and non-removable media. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired data and which can be accessed by computer 1500.

It will be appreciated that the functions of the computer 1500 can be enabled by software that can act as an intermediary between users and computer resources. This software may include an operating system which can be stored on disk storage 1507, and which can control and allocate resources of the computer system 1500. Disk storage 1507 may be a hard disk drive connected to the system bus 1511 through a removable or a non-removable memory interface.

Users of the computer can enter commands or data into the computer 1500 through input and output device(s) connected to the input interface 1504. Input devices may include but are not limited to a pointing device such as a mouse, trackball, stylus, touch pad, keyboard, microphone, and the like. These and other input devices connect to the processing unit 1505 through the system bus 1511. Output devices may include but are not limited to video and audio devices. The display device 1502 may be connected to the computer 1500 through the input interface 1504.

Computer 1500 can operate in a networked environment using connections to one or more remote computers. Network interface 1503 encompasses communication networks such as local area networks (LANs) and wide area networks (WANs) but may also include other networks.

The embodiments disclosed herein can be implemented through at least one software program running on at least one hardware device and performing network management functions to control the network elements. The network elements shown in FIG. 3, FIG. 4, and FIG. 15 include blocks which can be at least one of a hardware device, or a combination of hardware device and software module.

Embodiments herein enable methods and systems for capturing data from tennis game play and game analysis including generating game statistics for single player tennis or multi-player tennis sessions including games.

Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device.

The hardware device for tennis analysis can be a device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for analyzing a tennis session using one or more portable devices, and a tennis analysis system comprising one or more personal devices and a tennis analysis engine, said method comprising:
    collecting data from said tennis session periodically by said one or more portable devices, wherein each portable device is attached to a racket used in said tennis session;
    obtaining input from at least one from the group of players and support staff using at least a portable device from said one or more portable devices involved in said tennis session, wherein said input includes result of one or more points during said session;
    analyzing, by said tennis analysis system, said collected data from said tennis session, where said analysis includes at least identifying and classifying strokes, identifying rallies, and determining result of points, games, sets and matches during said session; and
    generating a plurality of game statistics based on said analysis by said tennis analysis system.

2. The method in claim 1, wherein said input from at least one from the group of players and support staff is obtained using at least one input button on a portable device from said one or more portable devices.

3. The method in claim 1, wherein said input from at least one from the group of players and support staff is obtained using an input mechanism on a personal device from said one or more personal devices.

4. The method in claim 1, wherein said input from said group of players is obtained using a gesture by at least one player from said group of players recorded by said one or more portable devices.

5. The method in claim 4, said method further comprising:
    recording gesture movement data by a portable device from said one or more portable devices.

6. The method in claim 5, wherein a gesture movement is recorded as an input when said gesture movement occurs within one among the following periods:
    pre-determined time interval after conclusion of immediately preceding rally; and
    before start of subsequently rally.

7. The method in claim 4, said method further comprising:
    analyzing gesture input movement data by a portable device from said one or more portable devices; and
    identifying a result based on the gesture data by said portable device.

8. The method in claim 4, wherein said gesture on a racket with a portable device from said one or more portable devices is one among the group of gestures comprising:
    clapping face of said racket a pre-determined number of times;
    clapping frame of said racket a pre-determined number of times;
    tapping said racket to a leg a pre-determined number of times;
    tapping said racket to a shoe a pre-determined number of times; and
    tapping said portable device with a finger a pre-determined number of times.

9. The method in claim 1, said method further comprising:
    providing feedback by a portable device from said one or more portable devices to indicate successful recording of result corresponding to an input.

10. The method in claim 9, wherein said feedback is visual feedback.

11. The method in claim 10, wherein said visual feedback is one among:
    blinking light with a pre-determined color;
    blinking light with a pre-determined pattern of blinking;

blinking light with a pre-determined number of blinks;
blinking light with a number of blinks equal to number of input claps; and
blinking light with a number of blinks equal to number of input taps.

12. The method in claim 9, wherein said feedback is audio feedback.

13. The method in claim 12, wherein said audio feedback is one among:
a pre-determined tone; and
a pre-determined pattern of tones.

14. The method in claim 1, said method further comprising overriding a result input for a concluded point by providing another result input before commencement of next point.

15. The method in claim 1, said method further comprising inferring missing result of a point, when said point is a game point.

16. The method in claim 1, wherein said statistics include single player statistics comprising:
number of points won out of the total number of points played;
number of points played with a volley at the net;
number of points won with a volley at the net; and
number of breakpoints converted out of total number of breakpoints played on opponent's serve.

17. The method in claim 1, said method further comprising:
pairing two portable devices by tapping their two host rackets in a pre-determined pattern.

18. The method in claim 17, wherein said pattern is to tap frame of first racket to the frame of second racket.

19. The method in claim 17, wherein said pattern is to tap frame of first racket to strings of second racket.

20. The method in claim 17, said method further comprising, said analysis system time-synchronizing paired devices by scanning sensor data streams from paired devices to identify actions corresponding to said pattern for pairing.

21. The method in claim 17, wherein said pairing comprises the step of exchanging data between said portable devices using peer to peer communication technology.

22. The method in claim 17, said method further comprising recording of device's identifier to identify the opponent of a player.

23. The method in claim 17, where said peer-to-peer communication technology is Near Field Communication (NFC) Technology operating in peer to peer and active mode, allowing said devices to communicate and synchronize when brought within close proximity of one another.

24. The method in claim 17, said method further comprising inferring result of a point when one player misses inputting the result of said point.

25. The method in claim 24, wherein said inference is based on opponent's input for said point.

26. The method in claim 24, wherein said inference is based on score of said tennis session, when said point is a game point.

27. The method in claim 1, wherein said statistics include two-player statistics comprising:
number of serves that a player directs to opponent's forehand;
number of serves that a player directs to opponent's backhand;
forehand strokes a player directs to the opponent's forehand;
forehand strokes a player directs to the opponent's backhand;
backhand strokes a player directs to the opponent's backhand;
backhand strokes a player directs to the opponent's forehand;
total service winners for a player in a match, said service winners including aces;
number of double faults;
highest serve speed;
lowest serve speed;
average serve speed;
number of winners;
total number of errors;
number of unforced errors; and
number of forced errors.

28. The method in claim 1, said method further comprising identifying directionality of a stoke as one among:
serve directed to opponent's forehand;
serve directed to opponent's backhand;
forehand stroke directed to opponent's forehand;
forehand stroke directed to opponent's backhand;
backhand stroke directed to opponent's backhand;
backhand stroke directed to opponent's forehand.

29. The method in claim 1, said method further comprising identifying characteristics of a serve as at least one among:
determining if said serve is a service winner;
determining if said serve is a service ace;
identifying if said serve results in a double fault; and
identifying speed of said serve.

30. The method in claim 1, said method further comprising identifying characteristics of a groundstroke as at least one among:
winner;
error;
unforced error; and
forced error.

31. A system for analyzing a tennis session, said system comprising:
one or more portable devices to:
collect data from said tennis session periodically, wherein each portable device is attached to a racket used in said tennis session, and
receive input from at least one from the group of players and support staff using at least a portable device from said one or more portable devices involved in said tennis session, wherein said input includes result of one or more points during said session; and
tennis analysis system to:
analyze, by said tennis analysis system, said collected data from said tennis session, where said analysis includes at least identifying and classifying strokes, identifying rallies, and determining result of points, games, sets and matches during said session; and
generate a plurality of game statistics based on said analysis.

* * * * *